(12) United States Patent
Salvi et al.

(10) Patent No.: US 9,936,119 B2
(45) Date of Patent: Apr. 3, 2018

(54) OPTICAL DEVICE INCLUDING A CAMERA, A DIAPHRAGM AND ILLUMINATION MEANS FOR INCREASING THE PREDETERMINED DEPTH OF FIELD OF THE CAMERA

(71) Applicant: bioMérieux, Marcy l'Etoile (FR)

(72) Inventors: Guido Salvi, Vaiano (IT); Antonio Sanesi, Florence (IT)

(73) Assignee: bioMérieux, Marcy l'Etoile (FR)

( * ) Notice: Subject to any disclaimer, the term of this patent is extended or adjusted under 35 U.S.C. 154(b) by 0 days.

(21) Appl. No.: 14/402,619

(22) PCT Filed: Jun. 20, 2013

(86) PCT No.: PCT/EP2013/062868
§ 371 (c)(1),
(2) Date: Nov. 20, 2014

(87) PCT Pub. No.: WO2013/190035
PCT Pub. Date: Dec. 27, 2013

(65) Prior Publication Data
US 2015/0156398 A1 Jun. 4, 2015

(30) Foreign Application Priority Data
Jun. 20, 2012 (EP) .................................... 12305702

(51) Int. Cl.
*H04N 5/232* (2006.01)
*G02B 13/24* (2006.01)
(Continued)

(52) U.S. Cl.
CPC ......... *H04N 5/23212* (2013.01); *G02B 13/24* (2013.01); *G03B 9/02* (2013.01);
(Continued)

(58) Field of Classification Search
CPC ............. H04N 5/23212; H04N 5/2256; H04N 5/2354; G02B 13/24; G03B 9/02;
(Continued)

(56) References Cited

U.S. PATENT DOCUMENTS 4,459,005 A * 7/1984 Harvey .................... G03B 7/16
396/106
6,034,372 A * 3/2000 LeVan ...................... G01J 5/08
250/338.1
(Continued)

FOREIGN PATENT DOCUMENTS

CN 101331499 A 12/2008
CN 102096796 A 6/2011
(Continued)

OTHER PUBLICATIONS

Bähr, Achim, "International Search Report," prepared for PCT/EP2013/062868, dated Sep. 2, 2013, four pages.

*Primary Examiner* — Nicholas Giles
(74) *Attorney, Agent, or Firm* — Winstead PC

(57) ABSTRACT

An optical device (1) including a fixed focus camera having a predetermined depth of field with an optical axis (55), wherein the optical device (1) comprises a diaphragm (5) positioned in the optical axis (55) of the camera and comprising a light passing aperture (53) for increasing the predetermined depth of field of said camera to provide an increased depth of field, wherein the diaphragm is attached to the camera, wherein the light passing aperture (53) of the diaphragm (5) is circular shaped within an opaque screen and positioned to have its centre point coincide with the optical axis (55) of the camera and wherein the optical device (1) further comprises illumination means evenly positioned around the optical axis (55) for evenly illuminating an object positioned within the increased depth of field of the camera.

19 Claims, 10 Drawing Sheets

(51) Int. Cl.
*G03B 9/02* (2006.01)
*G03B 13/18* (2006.01)
*G03B 15/02* (2006.01)
*G06K 7/10* (2006.01)
*H04N 5/225* (2006.01)
*G02B 27/00* (2006.01)

(52) U.S. Cl.
CPC ............ *G03B 13/18* (2013.01); *G03B 15/02* (2013.01); *G06K 7/10732* (2013.01); *G06K 7/10811* (2013.01); *G06K 7/10831* (2013.01); *H04N 5/2256* (2013.01); *G02B 27/0075* (2013.01)

(58) Field of Classification Search
CPC .... G03B 13/18; G03B 15/02; G06K 7/10732; G06K 7/10811; G06K 7/10831
See application file for complete search history.

(56) References Cited

U.S. PATENT DOCUMENTS

| | | | | |
|---|---|---|---|---|
| 6,749,310 | B2 * | 6/2004 | Pohlert | F21K 9/65 348/E5.029 |
| 6,761,561 | B2 * | 7/2004 | Mandelkern | A61B 1/00016 433/29 |
| 7,400,458 | B2 * | 7/2008 | Farr | G02B 27/147 250/550 |
| 7,579,577 | B2 * | 8/2009 | Ono | G02B 5/26 250/208.1 |
| 7,889,919 | B2 * | 2/2011 | Komiya | H04N 5/2256 356/404 |
| 7,920,172 | B2 * | 4/2011 | Chanas | H04N 5/232 348/222.1 |
| 8,917,349 | B2 * | 12/2014 | Wajs | H04N 5/225 348/229.1 |
| 2002/0044435 | A1 * | 4/2002 | Pohlert | F21K 9/65 362/13 |
| 2002/0065728 | A1 * | 5/2002 | Ogasawara | G06Q 20/208 705/23 |
| 2003/0234867 | A1 * | 12/2003 | Fujita | G02B 3/10 348/207.1 |
| 2005/0046969 | A1 * | 3/2005 | Beatson | G01N 21/8806 359/738 |
| 2007/0119942 | A1 * | 5/2007 | Barsotti | G06K 7/10712 235/462.24 |
| 2007/0133983 | A1 * | 6/2007 | Traff | G02B 5/23 396/506 |
| 2008/0013941 | A1 * | 1/2008 | Daley | G06T 5/50 396/121 |
| 2008/0284902 | A1 * | 11/2008 | Konno | A61B 5/4547 348/370 |
| 2009/0016574 | A1 * | 1/2009 | Tsukahara | A61B 5/117 382/117 |
| 2010/0066854 | A1 * | 3/2010 | Mather | G02B 5/005 348/222.1 |
| 2011/0234781 | A1 | 9/2011 | Hackel et al. | |
| 2013/0083184 | A1 * | 4/2013 | Yogesan | A61B 3/0033 348/78 |
| 2015/0036041 | A1 * | 2/2015 | Burrell | H04N 5/2256 348/370 |

FOREIGN PATENT DOCUMENTS

| | | |
|---|---|---|
| CN | 102197295 A | 9/2011 |
| DE | 102009017819 A1 | 10/2010 |
| JP | 2000099625 A | 4/2000 |
| JP | 2003098426 A | 4/2003 |
| WO | WO-9906871 A1 | 2/1999 |
| WO | WO-2007104829 A1 | 9/2007 |

* cited by examiner

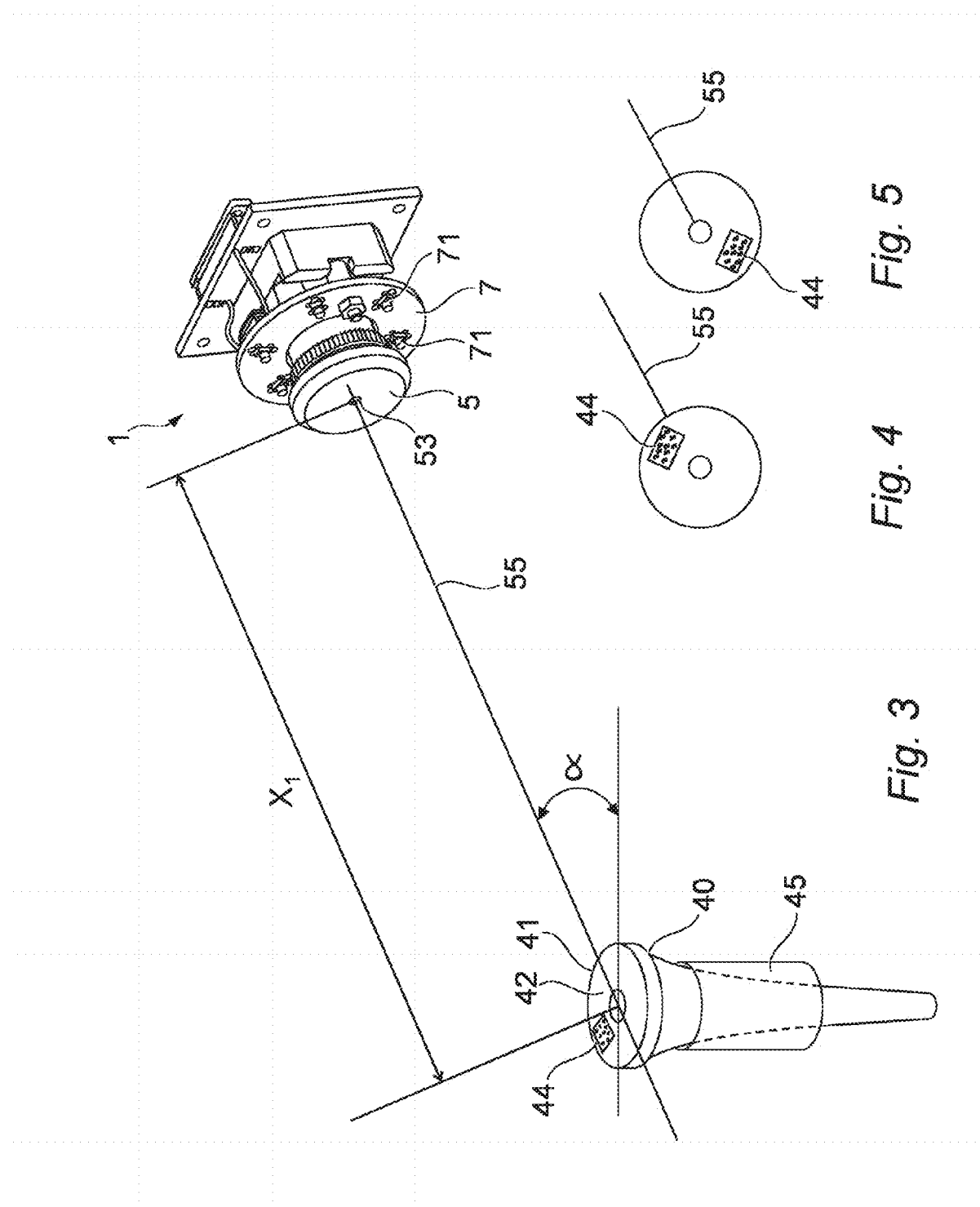

OPTICAL DEVICE INCLUDING A CAMERA, A DIAPHRAGM AND ILLUMINATION MEANS FOR INCREASING THE PREDETERMINED DEPTH OF FIELD OF THE CAMERA

FIELD OF THE INVENTION

The invention relates to an optical device including a fixed focus camera and a diaphragm for improving the depth of field of said camera and improving the quality of an image to be taken of an object located in the improved depth of field. The optical device according to the invention is specifically adapted for use in an optical reader, wherein the optical device is linked to means for image recognition of the image captured by the camera.

BACKGROUND OF THE INVENTION

In automated systems and procedures, optical devices can be used to monitor particular elements of said systems and procedures. The optical device is used to capture an image of said elements of the system or procedure. Using image recognition techniques, the image can be analysed and the result of this analysis can be used, for instance, to monitor and influence the control of the system or procedure. A typical use of such an optical device in an automated system is the use of the optical system to read an optical code or barcode attached to a product to identify the type of product as well as for instance the batch number of the product used in the system or procedure.

From a financial aspect, it is advantageous and often required to use an optical device with a camera that can be produced for relatively low costs, such as a fixed focus camera. The quality of the images obtained with the fixed focus camera is often adapted to the specific task for which the optical device is employed.

However, when a fixed focus camera is used the distance between the fixed focus camera and the object of interest has to be carefully adjusted in order to allow the camera to produce images of the object of interest with a sufficient quality to allow the subsequent step of image recognition. In practice, it is desired to provide a user of an optical device with at least some margin with respect to the distance between the camera of the optical device and the object of interest, while keeping at the same time the quality of the obtained images correct enough for the subsequent step of image recognition.

In order to allow this flexibility relating to the distance between a fixed focus camera and the object of interest, an available technical solution is to improve the depth of field of the camera. The improved depth of field of the camera should be adequate for the specific use and purpose of the optical device.

The US Patent Application US2007/0119942 discloses a method for improving the depth of field of a camera used in a linear optical barcode reader. The linear optical barcode reader according to US2007/0119942 comprises a camera with a photosensitive element or sensor and an optical receiving device, with one or more lenses, for forming an image on the sensor. The optical receiving device has an optical receiving path or optical axis. The device comprises in the optical axis of the optical receiving device, upstream or downstream of the objective, a diaphragm to improve the depth of field of the camera. This diaphragm has the form of an opaque screen stopping the light, with a light passing aperture. In use, the rays which pass through the aperture contribute to the formation of the image onto the sensor. By contrast, the light beams that are intercepted will not contribute to the formation of the image.

According to US2007/0119942, the effect of the presence of the diaphragm in the optical axis of the camera is that the depth of field of the camera is increased when compared with a camera which does not comprise the diaphragm.

The solution according to US2007/0119942 provides an improvement of the depth of field in one specific direction. This is due to the rectangular shape of the light passing aperture. The effect is that the solution according to the prior art can be used for a specific task such as reading a linear optical barcode. However, the solution according to the prior art document is not adapted to provide a general solution for increasing the depth of field of cameras used in an optical device for analysing objects with arbitrary shapes, such as 2-D optical codes. The solution according to US2007/0119942 would not be adapted to improve the depth of field of a camera used for a general task, such as a sample level detection.

Japanese patent application JP2003-098426 discloses a camera using a specific diaphragm to improve the depth of field of the camera. The specific diaphragm consists of a central part for transmitting only infrared rays and an outside part for transmitting only visible light. According to JP2003-098426, the use of the specific diaphragm in combination with specific lighting conditions eliminates the needs for a diaphragm with an auto iris control system. However, this solution is expensive and complex to operate.

The object of the invention is to provide an improved optical device with a camera and means for improving the depth of field of said camera and means for improving the quality of an image to be taken of an object located in the improved depth of field, wherein the improvement of the depth of field is not limited to a specific directional use of the optical device.

SUMMARY OF THE INVENTION

It should be noted that in the present text the wording "fixed-focus camera" is used to distinguish this type of camera from cameras which have the ability to adjust the focus distance of the camera.

In the present text the word "camera" makes reference to the combination of one or more lenses and a photosensitive sensor, wherein the lenses are used for forming an image on the sensor.

Under "the depth of field", the range of camera-object distances is meant within which the quality of the image obtained with the camera is sufficient for the specific use of the camera. If the camera is used in combination with means for image recognition, the "depth of field of the camera" would include the range of camera-object distances within which the quality of the image obtained would be sufficient to allow subsequent image recognition.

In the text under "improving the depth of field of a camera", the increase of the range of camera-object distances is meant within which the quality of the image obtained with the camera is sufficient for the specific use of the camera. The "increased" or "improved" depth of field allows more flexibility in the distance between the camera and the object of interest, compared to a camera which does not have this improved depth of field.

According to a first aspect of the invention, the invention relates to an optical device including a fixed focus camera having a predetermined depth of field with an optical axis, wherein the optical device comprises a diaphragm positioned in the optical axis of the camera and comprising a light passing aperture for increasing the predetermined depth of field of said camera to provide an increased depth of field, wherein the diaphragm is attached to the camera wherein the light passing aperture of the diaphragm is circular shaped within an opaque screen and positioned to have its centre point coincide with the optical axis of the camera, and wherein the optical device further comprises illumination means evenly positioned around the optical axis for evenly illuminating an object positioned within the increased depth of field of the camera.

The use of a circular shaped aperture in the diaphragm will help to improve the quality of images of an object obtained with the camera, irrespective of the orientation of the object with respect to the optical axis of the camera. This non-directional improvement is enforced by the presence of the specific illumination means, adapted to evenly illuminate an object of which an image is to be taken.

Preferably, the circular shaped aperture has a diameter within an opaque screen, for a predetermined depth of field, wherein the value of the diameter may remain constant during the operation of the optical device.

Preferably, the circular shaped aperture has a diameter, wherein the value of the diameter is fixed. Thus, the diameter cannot be adjusted.

According to a preferred embodiment of the invention, the illumination means comprises at least one illumination source and at least one illumination location for emitting light.

According to a preferred embodiment of the invention, the illumination means comprises at least one illumination source and at least two illumination locations for emitting light, wherein the illumination locations are positioned around the optical axis.

According to a preferred embodiment of the invention, the optical device comprises a support located around the optical axis of the camera and wherein the at least one illumination source is fixed on the support.

According to a preferred embodiment of the invention, the support for the at least one illumination source has the form of a ring positioned around the optical axis of the camera.

According to a preferred embodiment of the invention, the illumination means comprises two illumination sources which are symmetrically positioned with respect to the optical axis.

According to a preferred embodiment of the invention, the illumination means comprises at least one light emitting diode (LED).

According to a preferred embodiment of the invention, the illumination means comprises a plurality of LEDs positioned around the optical axis to provide an even illumination.

According to a preferred embodiment of the invention, the illumination means comprises at least two LEDs positioned around the optical axis.

According to a preferred embodiment of the invention, the illumination means comprises at least four LEDs positioned around the optical axis.

According to a preferred embodiment of the invention, the illumination means comprises six LEDs positioned around the optical axis.

Advantageously, the diaphragm is provided with an adjuster for adjusting the size of the light passing aperture.

According to a further embodiment of the invention, the optical device comprises a memory connected to the camera, for storing images taken by the camera.

According to a preferred embodiment of the invention, the optical device is provided with a microprocessor connected to the camera for processing the images taken by the camera.

According to a further embodiment of the invention, the camera comprises a CMOS photosensitive sensor.

According to a further aspect of the invention, there is provided an apparatus for automated analysis of a sample wherein the apparatus is adapted to perform an automated process for analysing the sample, the apparatus having a recipient for a consumable to be used in said automated process, wherein the apparatus further comprises an optical reader for identifying an optical code on the consumable, wherein the reader comprises an optical device according to the present invention.

Preferably, the reader is provided with means for processing and analyzing images taken by the optical device and wherein the optical reader is provided with instruction means adapted to generate instructions based on the processing and analysing of said images.

Advantageously, the apparatus is provided with control means for controlling the automated process performed by the apparatus, and the instruction means of the optical reader are connected to the control means of the apparatus in order to allow the control means to receive instructions after the processing and analysis of the images taken by the optical device.

According to a preferred embodiment of the invention, the apparatus is an apparatus for biological sample analysis.

According to another aspect of the invention, there is provided a method for identifying an optical code on an object by means of an optical device according to the invention, comprising the steps of:
- positioning the object and the optical device in a mutual position wherein the optical code on the object is within the increased depth of field of the optical device,
- evenly illuminating the optical code by means of illumination means positioned around the optical axis of the optical device,
- using the optical device for taking an image of the optical code on the object,
- processing the image taken by the optical device by means of an image recognition technique, in order to thereby identify the optical code.

BRIEF DESCRIPTION OF THE DRAWINGS

The invention will be better understood after the description that follows with reference to the accompanying drawings, wherein:

FIG. 3 shows a possible use of the optical device according to the invention for reading an optical 2-D barcode on top of a tip, FIG. 4 shows a first rotational position of the tip in a recipient for the tip; and FIG. 5 shows the tip in a second rotational position of the tip with respect to the recipient for the tip.

In FIG. 1, a first embodiment is shown of an optical device 1 according to the present invention. The optical device 1 comprises a camera and a diaphragm 5 which is positioned and attached to the camera in order to be in the optical axis of the camera. Details of the camera are shown in FIG. 2. The diaphragm 5 is provided with a light passing aperture 53 and the diaphragm is positioned in order to have the centre point of this light passing aperture 53 coincide with the optical axis of the camera. The camera is connected to a support 20 which is adapted to fix the optical device at an appropriate position with an appropriate inclination with respect to a support. This support could be used to position the optical device, for instance, inside an apparatus, such as an apparatus for biological testing.

As shown in FIG. 1, the optical device 1 is also provided with a ring 7 positioned around the optical axis of the camera. The ring 7 comprises illumination sources 71 fixed thereon. The ring 7 may rotate around the optical axis of the camera over an angle of 360°. The ring 7 provides a support for positioning the illumination sources 71 around the optical axis of the camera. The illumination sources 71 are positioned around the optical axis to allow the illumination sources 71 to evenly, i.e. homogeneously, illuminate an object which is positioned within the increased depth of field of the camera and of which a picture is to be taken. As the object is located in the increased depth of field of the camera, the object is evenly illuminated. The even illumination provides a homogeneous quality of the image taken of the object with respect to the optical axis of the camera. The even illumination avoids creating an image with areas having both good quality and poor quality.

In case the ring 7 comprises two illumination sources 71, the illumination sources may be symmetrically positioned on the ring 7. This means that both illumination sources 71 are separated by an angle of 180° between them.

In case the ring 7 comprises three illumination sources 71, the illuminations sources 71 may each be separated by an angle of 120° between them. The relationship between the illumination sources 71 and the position of the object of which a photo is to be taken is more clearly indicated in FIG. 3.

Figure 1:
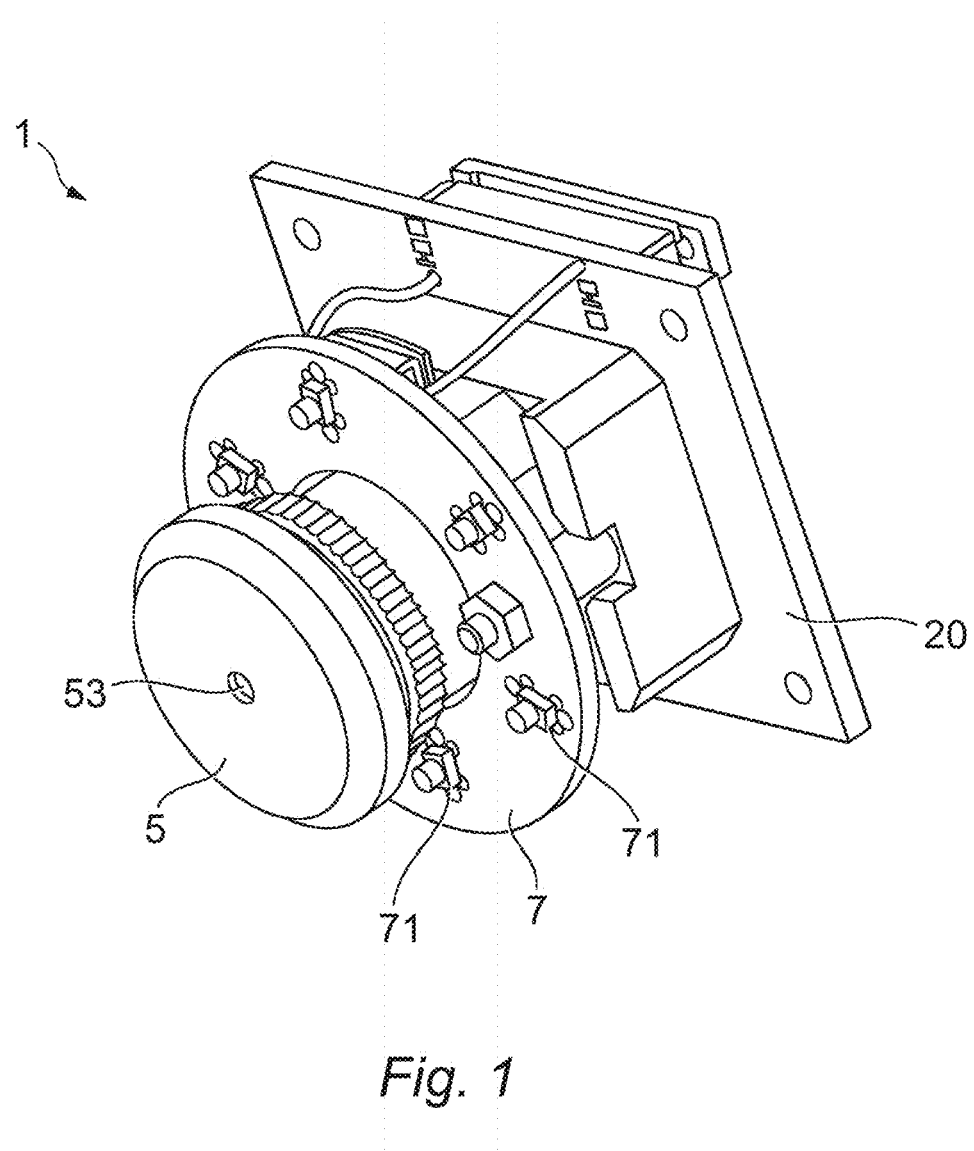
FIG. 1 shows a first embodiment of the optical device according to the present invention.

With reference to FIG. 1 it should be noted that the illumination sources 71 may also have the form of illumination locations. An illumination location is a point of departure of light which is emitted from the illumination sources 71 in the direction of an object of which an image should be taken. An illumination location may, for instance, be the end of an optical fibre which is related to an illumination source 71. In this embodiment several illumination locations may relate to one illumination source 71. As the illumination locations are positioned around the optical axis of the camera, the effect is that the light emitted by the plurality of illumination locations allows an even illumination of the object.

In an embodiment comprising one illumination source 71, the at least one illumination source 71 may be associated with at least two illumination locations to provide an even illumination. In case two illumination locations are used, the illumination locations may be symmetrically positioned around the optical axis to provide an even illumination for the object. In case more than two illumination locations are used, the illumination locations may be evenly distributed around the optical axis to ensure even illumination of the object of which is image should be taken. Alternatively, in a further embodiment where one illumination source 71 is positioned at a predetermined distance close to the optical axis to provide an even illumination, the illumination source 71 may be associated with at least one illumination location.

The combination of the illumination sources and illumination locations corresponds to illumination means. As a result, the optical device 1 comprises such illumination means.

Figure 2:
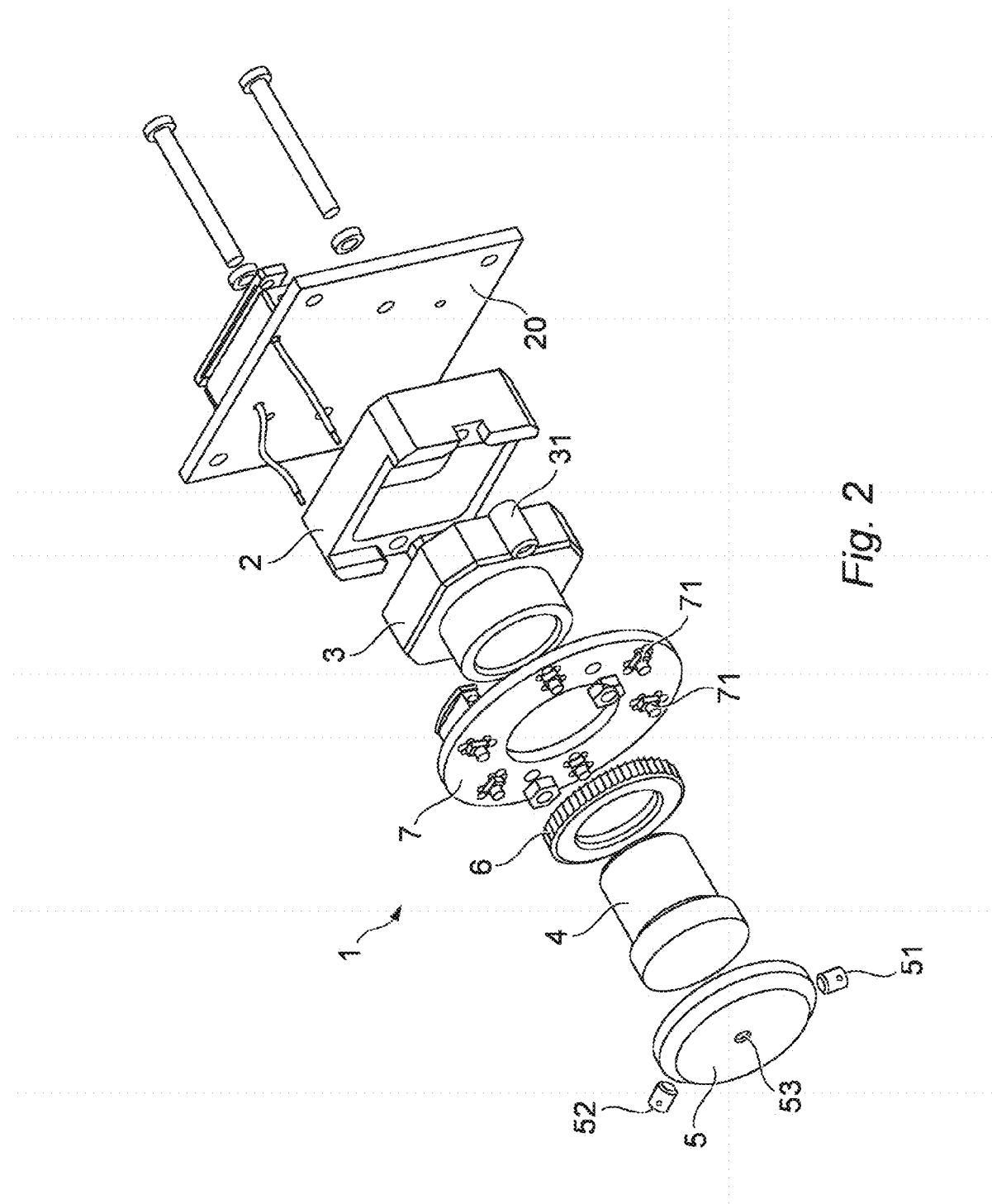
FIG. 2 shows the individual elements that make up the optical device according to FIG. 1.

In FIG. 2, the different elements of the optical device 1 are shown in their pre-assembly position. The optical device 1 comprises a support 20 for fixing the optical device 1 in an appropriate position and with an appropriate orientation with respect to an object of which an image should be taken.

The optical device 1 further comprises a camera comprising a camera body 2, a lens holder 3, a lens housing 4 and a locking nut 6. The camera body 2 is fixed to a lens holder 3. The lens housing 4 is fixed to the lens holder 3 comprising in its interior at least one lens. The locking nut 6 is used for blocking the lens housing 4 in the lens holder 3.

As shown in FIG. 2, the optical device 1 also comprises a ring 7 provided with illuminating sources 71 comprising specific characteristics such as: a reduced size to comply with the size of the camera, a low power consumption to avoid increasing consumption cost, a variety of colours to provide different colour illumination effects, a reduced aperture to provide a focused beam to illuminate the object. Thus, the illumination sources may be in the form of LEDs. The LEDs are positioned evenly around the optical axis of the camera in order to allow the illumination sources to evenly illuminate an object within the increased depth of field of the camera as previously described. The optical axis and the specific functioning of those illuminating sources 71 will be described in detail with reference to FIG. 3. In an embodiment where the ring 7 is provided with one illumination source 71, the ring 7 may rotate from one position to another position where the two positions are separated by an angle of 180° for example to provide an even illumination of the object. As a result, the illumination source 71 on the ring may provide two different illumination locations corresponding to the two positions of the ring 7.

In FIGS. 1 and 2, the ring 7 comprises six LEDs evenly spread out around the optical axis of the camera. It should be noted that another number of LEDs like four or eight can also be used as long as the LEDs cooperate to evenly illuminate an object within the increased depth of field of the camera.

As shown in FIG. 1, the diaphragm 5 is attached to the lens housing 4 of the camera and forms an opaque screen stopping the light from entering into the camera. The diaphragm 5 comprises a light passing aperture 53 so that for a beam of light rays' incident on the diaphragm, only the ray which passes through the aperture 53 and then to the one or more lenses within the lens housing 4 of the camera, will contribute to the formation of an image in the camera, while those intercepted by the diaphragm 5 are excluded there from.

The illumination source 71 is designed to optimize the density of light coming through the diaphragm 5 through the light aperture. The diaphragm 5 and the illumination source 71 provide an improved quality of an image to be taken in the increased depth of field of the camera.

The diaphragm 5 is provided with screws 51 and 52, such as Allen screws, in order to fix the diaphragm 5 to the lens housing 4 of the camera. It should be noted that the diaphragm 5 is positioned on the camera in order for the centre point of the aperture 53 of the diaphragm to coincide with the optical axis of the camera to which the diaphragm is attached. An adjuster comprising control knobs (not shown) can be provided on the diaphragm 5 to control the specific size of the diaphragm. The diameter of the light passing aperture remains constant during the operation of the apparatus.

The camera module used in the optical device 1 according to FIGS. 1 and 2 is typically based on a board with a photosensitive sensor, such as a complementary metal-oxide-semiconductor (CMOS) sensor. This will allow image acquisition so that an image of, for instance a barcode, can be completely mapped on the sensor itself.

The camera module is connected to an interface board based on a micro processor. The microprocessor manages the camera module and decodes the image obtained by the camera. The interface board has an embedded algorithm which is specific for the purpose of the optical device.

For instance, if the optical device is used for reading a 2-D barcode, the embedded algorithm will be adapted to decode the 2-D barcode.

The interface board may further manage the communication board which means that the interface board is linked to the operating system of the apparatus wherein the camera module is used. This communication could be used for test, calibration and debug purposes.

Furthermore, the interface board may be provided with a memory system like flash, RAM and an EEPROM. The interface board may also provide a power supply with a voltage supervisor, interface connectors and some other simple circuits for signal adjusting.

The image is acquired via the CMOS sensor and then transferred to the RAM memory for subsequent elaboration. The algorithm embedded in the interface board may then decode, for instance, the 2-D barcode and provides the results of this processing to the main board. The interface board based on a microprocessor may be responsible for managing the camera module in order to properly acquire the image to be processed.

The diaphragm 5 is provided with a light passing aperture 53 that may regulate the amount of light that passes. The diaphragm 5 may be responsible for increasing the depth of field of the camera and so enlarge the range of object window where the images are on focus.

As previously stated, the lens housing 4 may be blocked on the lens holder 3 by the lock nut 6 in order to fix the focus position of the lens.

A possible use of the optical device 1 according to the present invention is shown in FIG. 3. The optical device 1 is fixed in a certain position at a distance and inclination adapted to read a 2-D barcode 44 present on top of a tip 40 received in a recipient for the tip 45. The tip 40 has a circular top surface 41 with an aperture 42 in the centre thereof. This aperture 42 is needed for liquid handling via the bottom end of the tip 40. This allows the tip 40 to be used for transferring a certain amount of fluid from a first position for sucking in the fluid to a second position for dispensing the fluid at said second position.

The tip 40 could be any tip used in a device for biological analyses. Alternatively, the tip could be of the type which is provided in its interior with a specific coating. In use, it is important to be able to identify the specific tip 40 which is positioned in the recipient 45. For this purpose the tip 40 carries a 2-D barcode 44. With this 2-D barcode 44, not only the type of tip 40 can be identified, but also the batch of which the tip is part. This information is important for checking whether the right tip is positioned at the right position, in order to identify whether the tip is present or not, in order to establish the batch number to which the tip belongs, etc.

The total surface area available for printing the 2-D barcode 44 on top of the tip 40 is very limited because of the presence, on the one hand, of the border of the circular surface 41 of the tip and, on the other, of the presence of the aperture 42 in the centre of the top surface of the tip. Therefore, the 2-D barcode 44 may be relatively small with a dimension of typically 2×1 mm.

For practical reasons, the distance $X_1$ between the leading end of the optical device 1 and the centre of the tip 40 may be relatively long, in the order of 90-110 mm. Without any specific adaptation, the fixed focus length of the camera comprising a predetermined depth of field used in the optical device 1 would not be able to produce images with sufficient quality of the barcode 44 in order to allow the decoding of the barcode 44. The problem relating to this lack of quality is that the tip 40 can rotate within the recipient 45. That means that even if the optical device 1 is fixed with respect to the recipient 45 for the tip, it is still possible that the position of the barcode 44 with respect to the optical device 1 can differ.

FIGS. 4 and 5 show a first and a second rotational position of the tip 40 with respect to the recipient 45 and therefore a first and second position of the barcode on top of the tip 40 with respect to the optical device 1. In FIGS. 4 and 5 only part of the optical axis 55 is shown. In the case of FIG. 4, the barcode 44 is positioned in a first position with respect to the optical device 1. In the position according to FIG. 5, the distance between the optical device 1 and the barcode 44 is longer than in the position according to FIG. 4.

In order for the optical device 1 to be able to read the barcode 44 in any position of the barcode 44 with respect to the optical device 1, the camera of the optical device 1 needs to have a sufficient depth of field to allow the optical device 1 to take an image of the barcode 44 with sufficient quality for decoding the barcode.

In the use of the optical device 1 for reading an optical code 44, a first possibility is to position the object provided with the optical code 44 in a fixed position. Thereafter, the optical device 1 is placed in position wherein the optical device 1 can take an image of the optical code 44 on the object. This means that the optical device 1 is positioned to ensure that the optical code 44 is within the depth of field of the camera of the optical device 1.

Alternatively, the optical device 1 is fixed in a position and thereafter the object provided with the optical code 44 is placed in a position with respect to the optical device 1, to have the optical code 44 within the increased depth of field of the camera of the optical device 1.

In any case, in order to allow the optical device 1 to take an image of the optical code 44 on an object, the mutual position of the optical device 1 and the optical code 44 should be such that the code 44 is within the increased depth of field of the camera of the optical device 1.

According to FIG. 3, the predetermined depth of field of the optical device 1 is increased by using a diaphragm 5 with, in its centre, a light passing aperture 53. This light passing aperture 53 is circular and the centre point of the circular coincides with the optical axis 55 of the camera of the optical device 1. As the light passing aperture 53 is circular, the shape of the aperture helps the optical device to have a similar resolution in all possible directions. Thus rotation of the tip 40 has no effect on the quality of the image taken in, for instance, the position according to FIG. 4 compared to the image taken in the position according to FIG. 5. The sufficient quality of the image of the barcode 44 in all possible positions can be guaranteed.

The second adaptation related to the optical device 1 according to FIG. 3 to ensure a good quality image is the presence of the ring 7 with the illumination means 71. The optical device 1 is specifically adapted to be used in the interior of an apparatus such as an apparatus for biological analyses. This means that the optical device 1 is used in the dark. The illumination means 71 are evenly positioned around the optical axis 55 to evenly illuminate the object of which an image must be taken, in this case the top surface 41 of the tip 40. The combination of the presence of a diaphragm 5 for increasing the depth of field and the illuminating sources 71 on the ring 7 provide together an equal image quality for the images obtained with the fixed focus camera in the optical device. This quality will be provided for all the possible positions of the barcode 44 with respect to the optical device 1.

The optical device 1 according to the invention is specifically suitable for reading a barcode on a consumable that is used in an apparatus for biological analyses and tests. This type of barcode may be present, for instance, on a consumable in the form of a tip. According to the invention the optical device may be used to take an image of the surface of the tip in the area wherein the barcode is expected to be found. Once the image is taken, the image can be processed using image recognition techniques.

A first use of the optical device 1 is to use the outcome of the image recognition as a means to check the barcode's presence or absence. The absence of the barcode could be an indication that the tip is not present or that the tip is not properly positioned in the apparatus.

If a barcode is present, the optical device 1 can be used to read the barcode to thereby identify the specific tip that is positioned in the apparatus. The identification of the tip is an important safety step for the proper operation of the apparatus. The result of the identification of the consumable allows the operator or an automatic control system, in a first instance, to check whether the right consumable is positioned in the right place before the apparatus can authorise a specific analysis procedure or test to start.

The identification of the consumable can also provide information about the specific batch of consumables from which the tip belongs to. It is possible that the results of a procedure or test need to be adjusted after the test is completed by applying a correction which is linked to the batch of consumables that is used in the procedure or test. Moreover or alternatively, the identification of the consumable could be used in a calibration procedure using information linked to a specific batch of consumables, prior to launching the apparatus or test.

A second use of the optical device 1 is to use the identification of a first consumable used in an apparatus and to compare this first consumable with a further consumable which is used in the same apparatus. This second consumable could be identified in any proper way or manner, manually or automatically, for instance by using a further barcode reader. The identification of the first consumable, including its type and the batch number, can be compared to similar information of the second consumable. Once the two consumables have been compared, it is possible, in the operation of the apparatus to only allow the start of a procedure or test if the identification of the first consumable confirms that it matches the identity of the second consumable.

For each specific use of the optical device, the algorithm used to process the image taken by the camera of the optical device has to be adapted to this specific use.

A specific embodiment will now be described. In the following example the use of the optical device according to the invention will be described with reference to the use of the optical device for reading a 2-D barcode on the top of a tip. The 2-D barcode in the example is a DataMatrix ECC-200 barcode. This type of barcode typically has a matrix of 8×18 elements.

The position of the optical device 1 with respect to the top of the tip 40 used in this example is shown in FIG. 3. The dimensions of the different elements and the distances between the several elements are further detailed in FIGS. 6 and 8.

Figure 6:
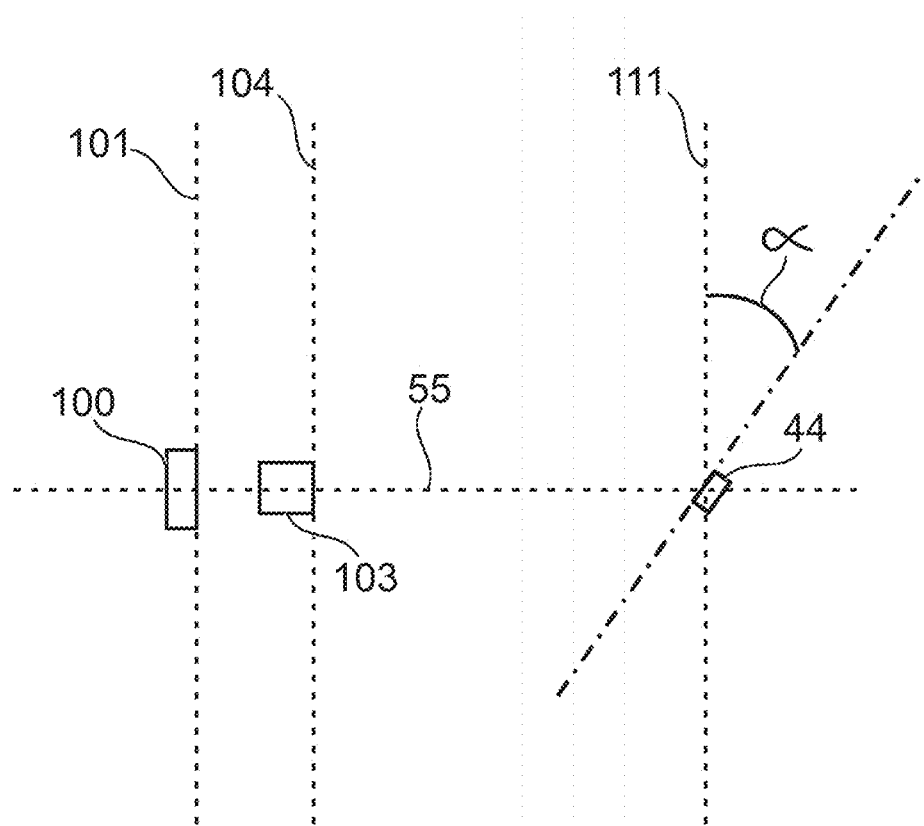
FIG. 6 shows the basic geometry of the optical device according to the invention for reading out a 2-D barcode positioned in the optical axis of the optical device.

According to FIG. 6, a photosensitive sensor 100 of the optical device 1 is positioned in a sensor plane 101. The sensor 100 is positioned in the optical axis 55 of the optical device. The target for taking an image is the 2-D barcode 44. The barcode 44 is positioned in a target plane 111.

$\alpha$ is the angle between the optical axis 55 and the target plane 111 (see FIG. 6) of the barcode 44. In the example the angle $\alpha$ is set to be between 35° and 40°.

A focus system is present in the form of a lens between the sensor 100 and the barcode 44. The lens 103 has an end lens plane 104. The distance between the sensor plane 101 and the end lens plane 104 is 25.25 mm. The lens 103 has a thickness taken in the direction of the optical axis of 14.45 mm.

The distance between the end lens plane 104 and the target plane 111 is 102.45 mm.

In order to produce an image which allows the barcode 44 to be read, irrespective of the rotational position of the tip 40 on which the barcode 44 is attached with respect to the optical device 1 (see FIG. 3), two conditions should be met:
1) all elements of the data-matrix making up the barcode 44 must be located within a range having two limits separated by a distance called the depth of field (DOF), and
2) the quality of the image should be sufficient such that each single element of the data-matrix can be recognised using the algorithm that is applied for processing the obtained image.

The meaning and the definition of "depth of field" is explained with reference to FIG. 7. The following definition is used to refer to the "depth of field" of the optical device: if an object is seen through an optical system, the depth of field is the interval of object-distances which give an acceptable sharpness of the image, for the particular use for which the image is taken.

Figure 7:
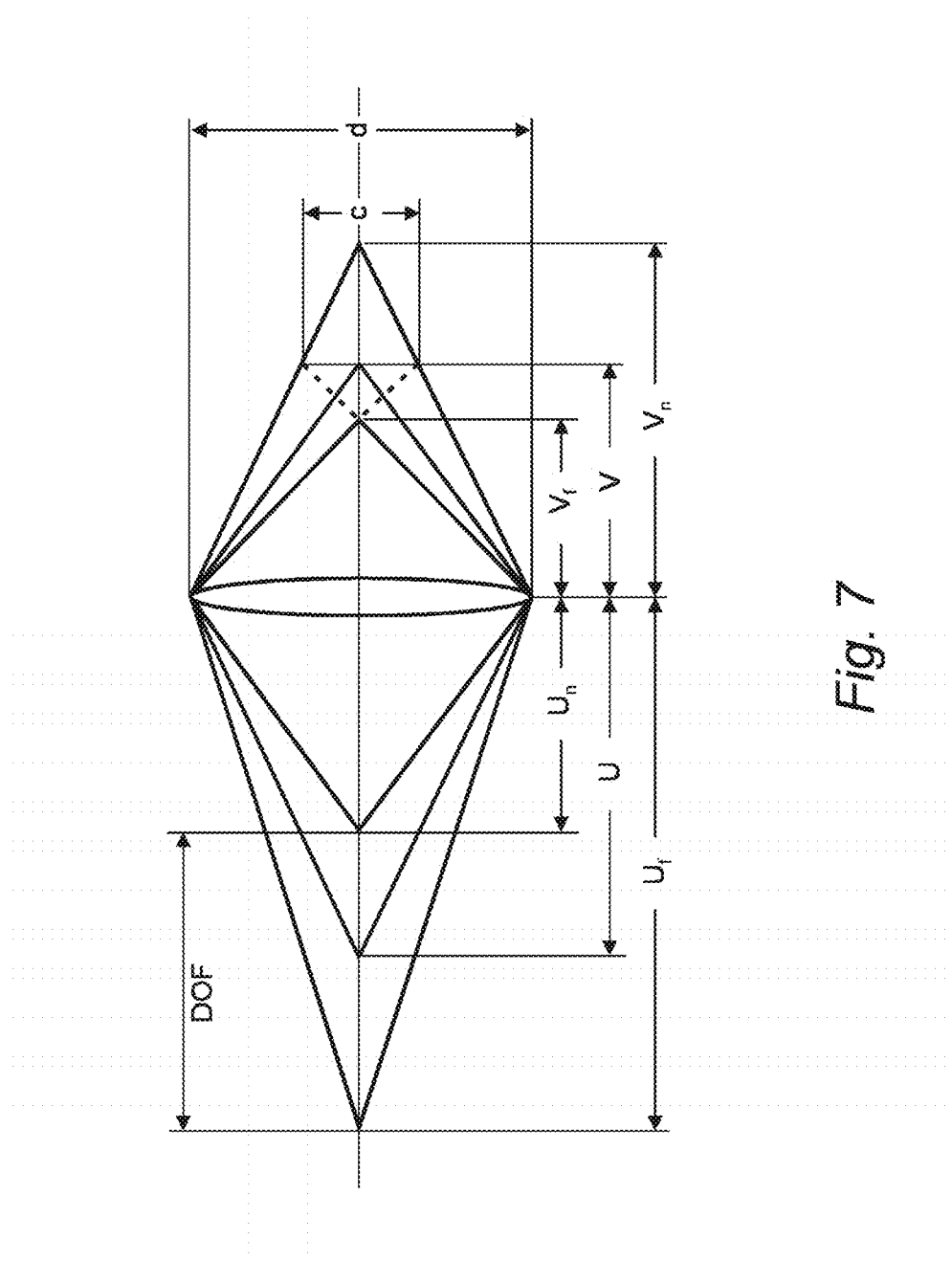
FIG. 7 is a graphical representation of the calculation for obtaining the depth of field of an optical device.

For a better comprehension FIG. 7 shows,

U being the object distance;

$U_f$ being the far limit of the depth of field;

$U_n$ being the near limit of the depth of field;

For the size of the depth of field (DOF) the following equation applies:

$$DOF = U_f - U_n;$$

V is the image distance;
$V_f$ is the image of the far limit;
$V_n$ is the image of the near limit;
d is the lens opening;
c is the diameter of the circle of confusion.

For f-number N and magnification m (both related to the focal distance f) the following equation applies:

$$N = \frac{f}{d}$$

$$m = \frac{V}{U}$$

The image (V) and object (U) distance are related by the following equation:

$$\frac{1}{U} + \frac{1}{V} = \frac{1}{f}$$

The following equations defining the DOF limits can be derived as follows:

$$U_n = \frac{U}{1 + \frac{N \cdot c}{f \cdot m}}$$

and $$U_f = \frac{U}{1 - \frac{N \cdot c}{f \cdot m}}$$

For the bar code reading, these equations are used to calculate the required DOF.

Figure 8:
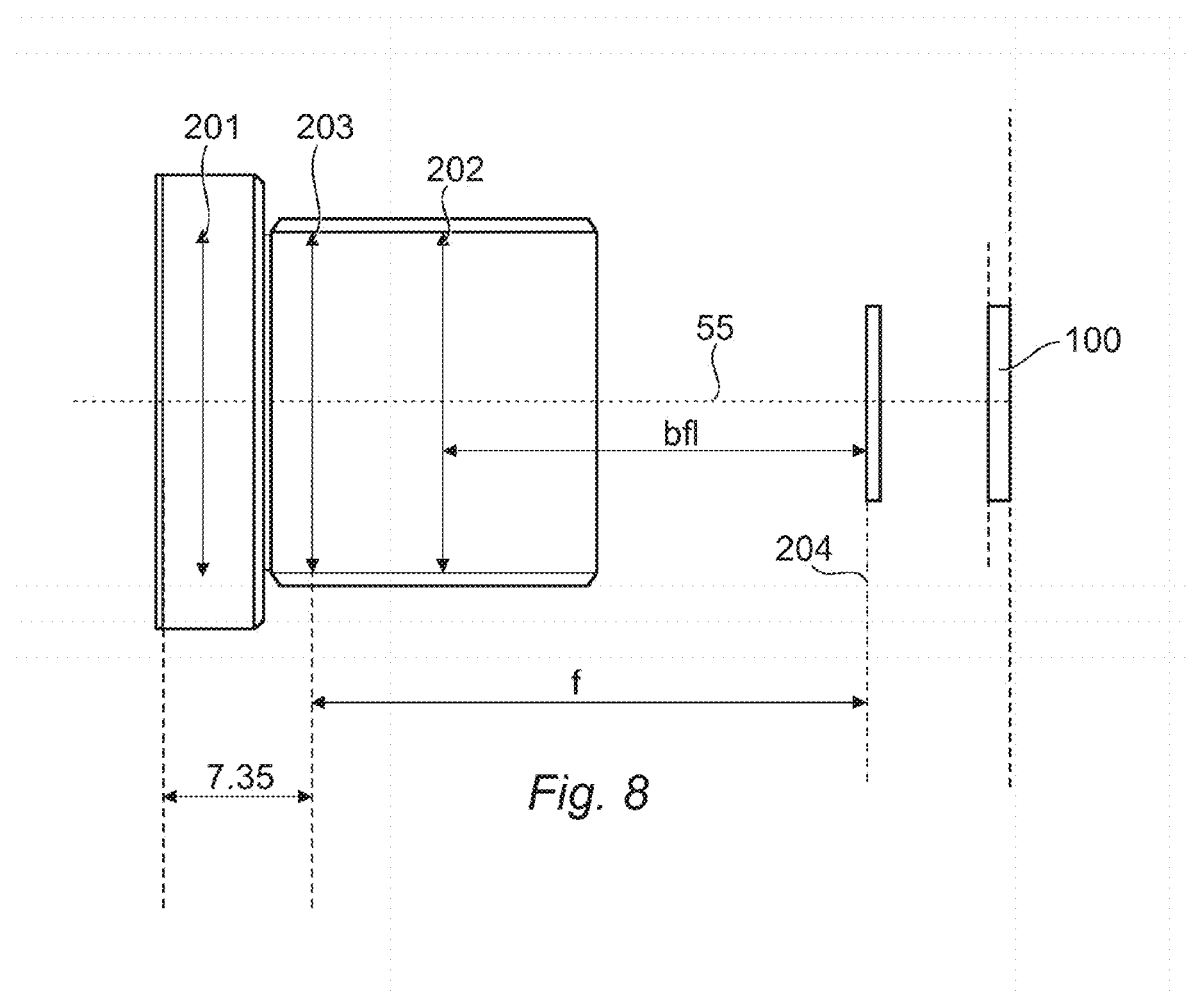
FIG. 8 is a representation of an optical system comprising a first lens and a second lens positioned at a distance of an image plane and a photosensitive sensor.

In FIG. 8 a schematical embodiment of an optical device is shown having two lenses, a first lens 201 and a second lens 202.

The focal distance f of the equivalent lens 203 is: f=16 mm

The back focal length bfl, from the second lens 202 to the focal plane, is: bfl=11.8 mm The object distance U, which is the distance between the object and the equivalent lens, then becomes:

$$U = [\text{object; system}] + 7.35 \text{ mm}$$

The nominal position is [object; system]=102.45 mm, which corresponds to $$U=109.8 \text{ mm and } V=18.7 \text{ mm}.$$

The tolerance on the total distance is +/−1.2 mm, wherein the 'total distance' is the distance between the edge of the focus lens, lens 201 and the sensor 100.

The dimension of the circle of confusion is calculated from the data matrix projected on the sensor 100.

Figure 9:
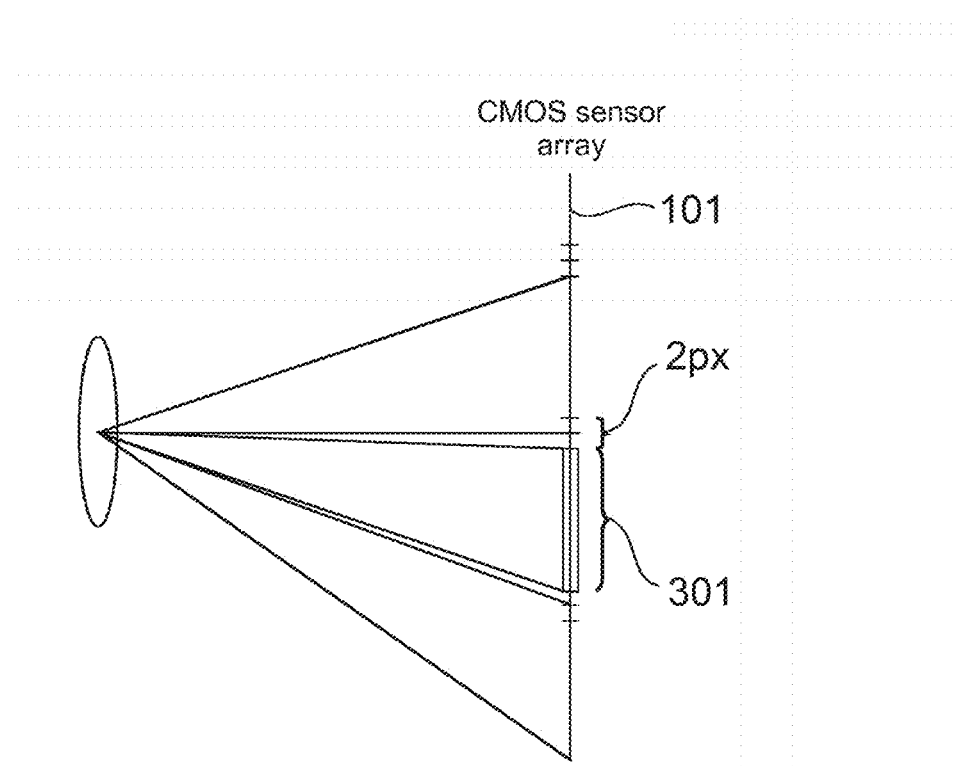
FIG. 9 is a graphical representation for indicating an area of confusion related to a lens.

FIG. 9 represents a ray tracing from the lens along the optical axis 102.

Figure 10:
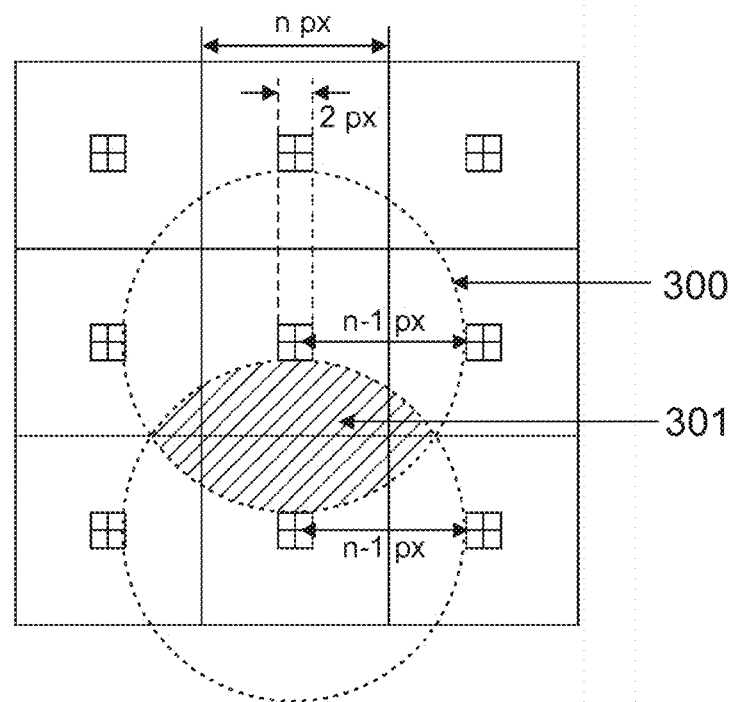
FIG. 10 shows elements for calculating a circle of confusion.

FIG. 10 represents a transverse view of the sensor array.

With reference to FIGS. 9 and 10 it appears that the circle of confusion 300 has a radius of n-1 pixels. The area of confusion is indicated with reference number 301. When p is taken to be the size of the pixel projected on the sensor array, then the diameter of the circle of confusion is:

$$c = 2*(n-1)*p$$

In the transverse view of the sensor array, we can see that the size of each single element of the data-matrix projected on the sensor has a dimension of n pixels, then:

$$n*p = m*L \text{ (where } L \text{ is the size of a single element in the data matrix)}$$

So, in the end:

$$c = 2*m*L - 2*p$$

Figure 11:
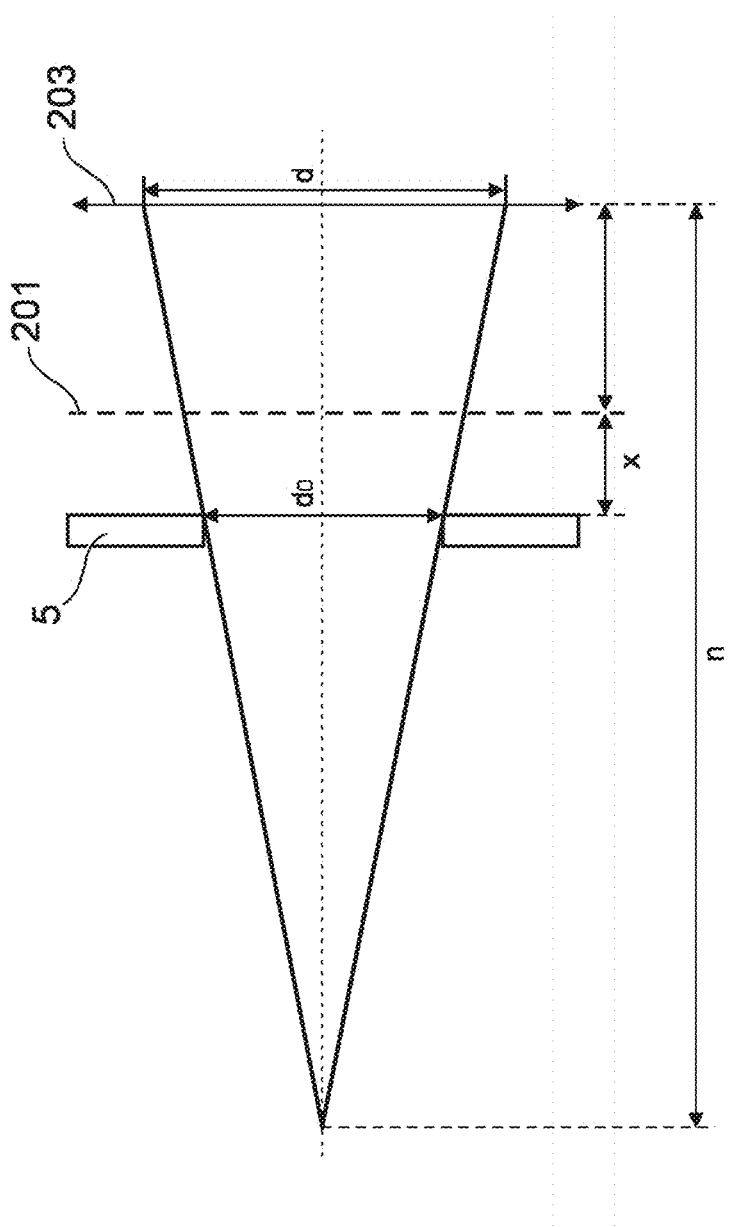
FIG. 11 shows the relationship between the camera—object distance and the size of a light passing aperture in a diaphragm.

The influence of the presence of a diaphragm is described with reference to FIG. 11.

The lens opening is controlled by a diaphragm 5, having a light passing aperture 53. As the diaphragm 5 is at a certain distance x from of the first lens which corresponds to a distance x+6.5 mm from the equivalent lens, the lens opening depends on the object distance as is shown in FIG. 11.

$$d = d_0 \cdot \frac{U}{u - 7.35 \text{ mm} - x}$$

At the nominal position (U=109.8 mm), d=1.07* $d_0$.

Figure 12:
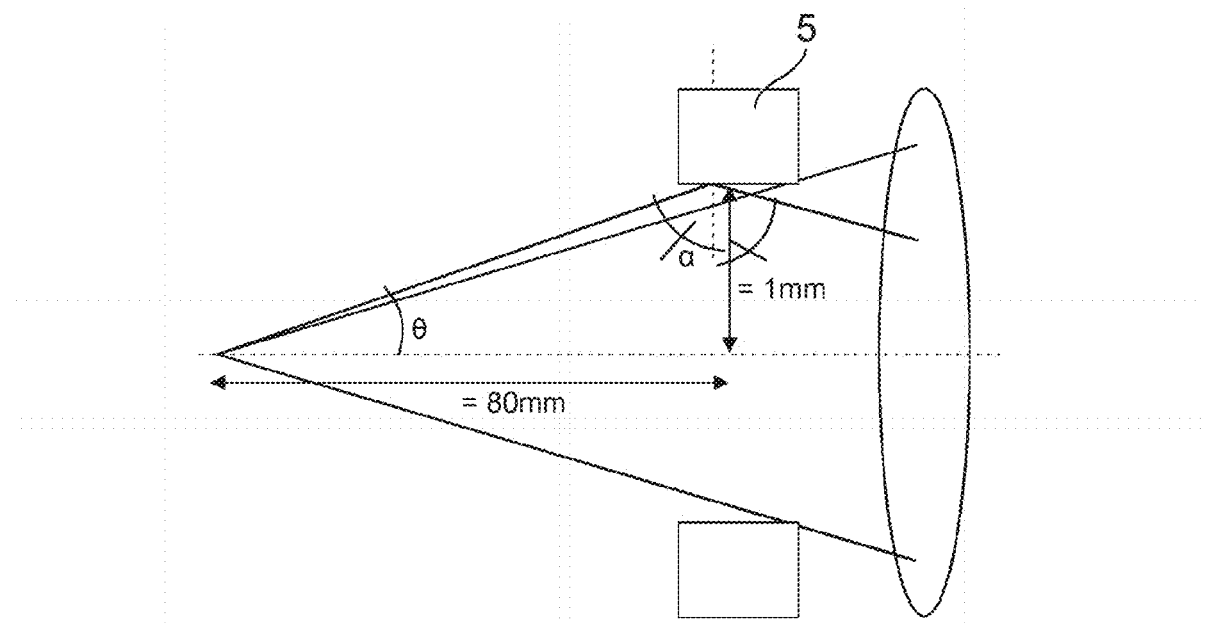
FIG. 12 shows the possible influence of the thickness of the diaphragm on the amount of light passing through the light passing aperture in the diaphragm.

The influence of the thickness of the diaphragm is shown in FIG. 12.

Geometrically $\alpha = 180° - 90° - \theta$ $\theta$ is the angle of the opening at the location of the object, defined as:

$$\tan \theta = \frac{\text{diaphragm}/2}{u} \leq \frac{1}{80} => \theta \approx 0.72°$$

Then if $\alpha \geq 89°$, the thickness of the diaphragm does not contribute to increase the lens opening but the amount of light getting into the optical system increases, the reflected rays as shown on in FIG. 12 increase the amount of light.

The following equations have been derived:

| | |
|---|---|
| Lens opening | $d = \text{diaphragm} \cdot \frac{U}{U - 6.5 \text{ mm} - x}$ |
| f-number | $N = \frac{f}{d}$ |
| Magnification | $m = \frac{V}{U}$ |
| Circle of confusion | $c = 2 \cdot m \cdot L - 2 \cdot p$ |
| Near limit | $U_n = \frac{U}{1 + \frac{N \cdot c}{f \cdot m}}$ |
| Far limit | $U_f = \frac{U}{1 - \frac{N \cdot c}{f \cdot m}}$ |

Figure 13:
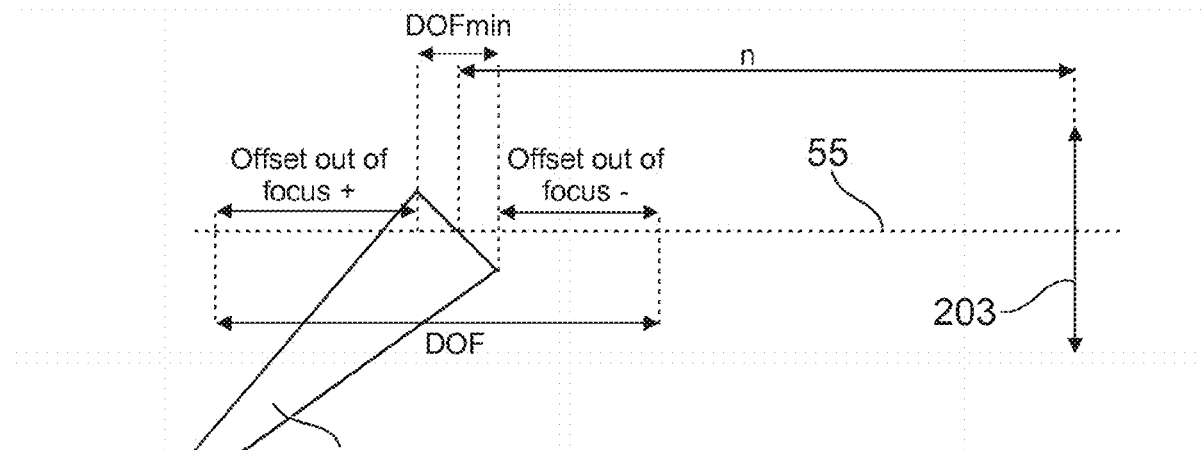
FIG. 13 shows the minimum size of the depth of field for a of a surface which is tilted with respect to the optical axis of the optical device.
Figure 14:
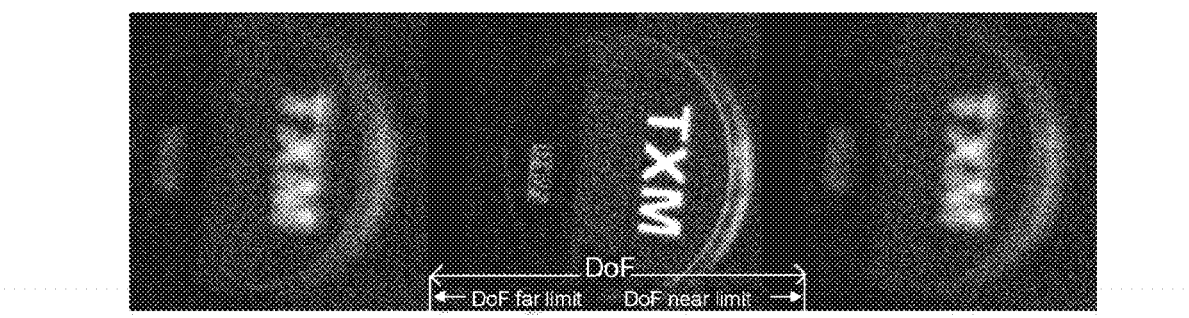
FIG. 14 shows an example of an image taken with a camera without the use of a diaphragm.
Figure 15:
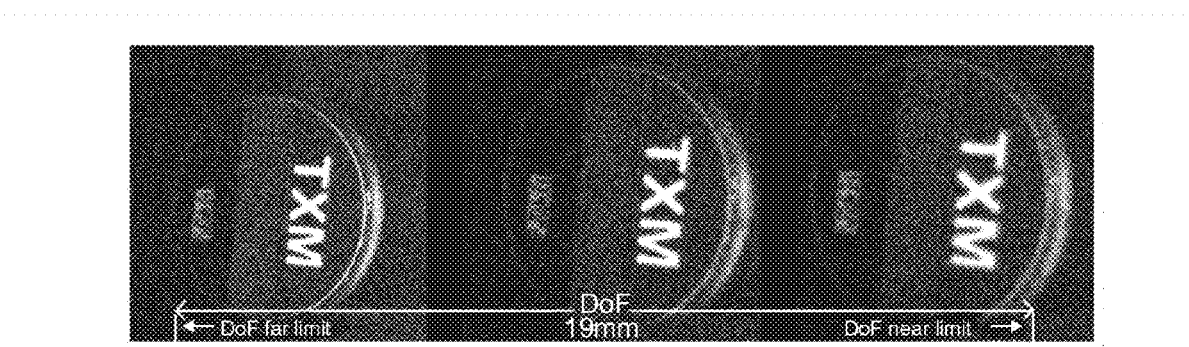
FIG. 15 shows an image of the object according to FIG. 14 obtained by the camera with the use of a diaphragm.

The plane containing the barcode 44 is tilted with respect to the orthogonal plane as shown in FIG. 13. The minimum of DOF is now defined as the projection of the tip diameter along the optical axis 55. As it is interesting to compare the minimum of DOF to the actual DOF, this comparison is performed with the offset out of focus as defined on the FIG. 13.

The offset out of focus has two coordinates:

$$\text{Offset out of focus} += U_f - U_{f\,min} = U_f - \left(U + \frac{DOF_{min}}{2}\right)$$

$$\text{Offset out of focus} -= U_n - U_{n\,min} = U_n - \left(U + \frac{DOF_{min}}{2}\right)$$

The combination of diaphragm 5 and equivalent lens 203 causes a diffraction (circular opening of diameter d) assessed by the angle θ diff, according to the Rayleigh criterion:

$$\sin\theta_{diff} = 1.22 \cdot \frac{\lambda}{d}$$

The angle of diffraction is the top angle of the Airy disk, its radius is:

$r(\text{Airy}) = v^* \tan \theta_{diff}$

As long as the diameter of the circle of confusion is smaller than the diameter of the Airy disk, the phenomenon of diffraction does not have any influence.

Now the minimum diameter $d_0$ of the diaphragm 5 can be calculated to get rid of the diffraction:

At the nominal position (U=109.8 mm; V=18.7 mm), the circle of confusion has a diameter of $c = 0.032$ mm (default approximation).

This result is the upper limit for the diameter of the Airy disk, which imposes a condition on the diffraction angle:

$\theta_{diff} \leq 0.048°$

The condition on the lens opening is:

$d \geq 1.07$ mm

Then the minimum diameter of diaphragm required is:

$d_{0min} = 1.00$ mm

To avoid any problem with the diffraction, and taking into account the mechanical tolerance of the size of the aperture 53 of the diaphragm 5, the aperture 53 should at least have a diameter of 2 mm.

The relation Lens opening—diaphragm diameter at the nominal position is:

$d = 1.07 * d_0$ and $d_0 \geq 2$ mm to get rid of the diffraction.

The mechanical tolerance on the z-positioning of the tip (+/−2.847 mm) is leading to a needed depth of field of:
3.717 mm (40° projection+2.847 mm)
+6.43 mm (DOFmin)
+3.717 mm (40° projection+2.847 mm)
=13.87 mm Then taking into account any hidden tolerances such as plastic of tip, the film whereon the barcode is printed, as well as any effect on DOF due to manufacturing tolerances such as uncertainty in the order of 2%, the minimum depth of field is fixed at 15 mm, this value being related to the usage of diaphragm of 2 mm+/−0.05 mm of manufacturing tolerance and lens opening 2.18 mm.

To verify the result of the calculation, possible errors on some characteristics are taken into account:
Focal distance: f=16.0 mm with a tolerance of +/−5% (0.80 mm)
Back focal length: bfl=11.8 mm with a tolerance of +/−5% (0.59 mm)
Length of optic: 14.45 mm with a tolerance of +/−0.4 mm The error on the focal distance is the characteristic that has the largest influence. When the image distance (V) is supposed to be fixed, with 5% of uncertainty, this will lead to a relative error in the order of 28% for the DOF, 43% for the circle of confusion and 52% for the object distance.

These numbers indicate that the uncertainty is rather important. If the image distance (V) is tuned to find again the object distance obtained with f=16.00 mm, the result is as follows:
Tuning of the image distance: Δ V≈6.8%
Object distance: Δ U≈2.7%
DOF: Δ DOF≤0.1%
Circle of confusion: Δ c≈12%

The calculated variation of DOF, being less then 0.1%, is acceptable.

At the nominal position the circle of confusion has basically a diameter of 0.032 mm, 12% of uncertainty can make it decrease to 0.028 mm. With a lens opening of 2.19 mm the Airy disk caused by diffraction has a diameter in the order of 0.0132 mm which is small enough not to disturb the geometrical optics.

With respect to the influence of both focal distance and back focal length the following can be noted:
Two extreme cases are simulated and reviewed:
1) +5% of focal distance, −5% of back focal length
2) −5% of focal distance, +5% of back focal length In both cases the tuning is operated on the image distance (V) to get the expected DOF, previously obtained at the nominal position, in the first case 1) the DOF advances 1.2 mm; in the second case 2) the DOF goes 1.2 mm back.

Consequently the tolerance on the distance separating the focus lens and the sensor is +/−1.2 mm.

As a result, in any case the error on the focal distance can be acceptably compensated by adjusting the position of the system.

The invention claimed is:

1. An optical reader for identifying an optical code on an object, said optical reader comprising an optical device comprising a fixed focus camera having a predetermined depth of field with an optical axis for taking an image of the optical code of said object, wherein the optical device comprises a diaphragm positioned in the optical axis of the camera, wherein the diaphragm comprises a hole forming a light passing aperture, the diaphragm being positioned between the object and a lens housing of the fixed focus camera, for increasing the predetermined depth of field of said camera to provide an increased depth of field, wherein the diaphragm is attached to the camera, wherein the light passing aperture of the diaphragm is circular shaped within an opaque screen and positioned to have its centre point coincide with the optical axis of the camera and wherein the optical device further comprises at least one illumination source, wherein the at least one illumination source is situated within the optical device and is evenly positioned at the same distance from the optical axis and around the optical axis for evenly illuminating the object positioned within the increased depth of field of the camera, the object being positioned such that the optical code and the optical device are in a mutual position, wherein the optical code is within the increased depth of field of the optical device.

2. The optical reader according to claim 1, wherein the at least one illumination source comprises at least one illumination location, wherein the at least one illumination location comprises a point of departure of light emitted from the at least one illumination source.

3. The optical reader according to claim 1, wherein the at least one illumination source comprises at least two illumination locations for emitting light, wherein the at least two illumination locations are positioned around the optical axis.

4. The optical reader according to claim 2, wherein the optical device comprises a support located around the optical axis of the camera and wherein the at least one illumination source is fixed on the support.

5. The optical reader according to claim 4, wherein the support for the at least one illumination source has a form of a ring positioned around the optical axis of the camera.

6. The optical reader according to claim 1, wherein the at least one illumination source comprises two illumination sources, wherein the two illumination sources are symmetrically positioned with respect to the optical axis.

7. The optical reader according to claim 1, wherein the at least one illumination source comprises at least one light emitting diode (LED).

8. The optical reader according to claim 7, wherein the at least one illumination source comprises a plurality of LEDs evenly positioned around the optical axis.

9. The optical reader according to claim 7, wherein the at least one illumination source comprises two LEDs positioned around the optical axis.

10. The optical reader according to claim 7, wherein the at least one illumination source comprises six LEDs positioned around the optical axis.

11. The optical reader according to claim 1, wherein the diaphragm is provided with an adjuster for adjusting a size of the light passing aperture.

12. The optical reader according to claim 1, wherein the optical device comprises a memory connected to the camera for storing images taken by the camera.

13. The optical reader according to claim 1, wherein the optical device is provided with a microprocessor connected to the camera for processing images taken by the camera.

14. The optical reader according to claim 1, wherein the camera comprises a CMOS photosensitive sensor.

15. An apparatus for automated analysis of a sample wherein the apparatus is adapted to perform an automated process for analyzing the sample, the apparatus comprising a recipient for a consumable to be used in said automated process, wherein the apparatus further comprises an optical reader for identifying an optical code on the consumable, according to claim 1.

16. The apparatus according to claim 15, wherein the optical reader comprises a microprocessor for processing and analyzing images taken by the optical device and wherein the optical reader is configured to generate instructions based on processing and analyzing of images.

17. The apparatus according to claim 16, wherein the apparatus is configured to control the automated process performed by the apparatus, wherein the apparatus is configured to receive instructions after the processing and analyzing of the images taken by the optical device.

18. The apparatus according to claim 15, wherein the apparatus is an apparatus for biological sample analysis.

19. A method for identifying an optical code on an object using an optical reader according to claim 1 the method comprising:
- positioning the object and the optical device in a mutual position, wherein the optical code on the object is within the increased depth of field of the optical device;
- evenly illuminating the optical code by the at least one illumination source positioned around the optical axis of the optical device;
- using the optical device for taking an image of the optical code on the object; and
- processing the image taken by the optical device using image recognition technique in order to thereby identify the optical code.

* * * * *